United States Patent [19]

Lindgren

[11] 4,156,816

[45] May 29, 1979

[54] OPTICAL FIRE-DETECTOR

[75] Inventor: Erik G. Lindgren, Stockholm, Sweden

[73] Assignee: Telefonaktiebolaget L M Ericsson, Stockholm, Sweden

[21] Appl. No.: 821,742

[22] Filed: Aug. 4, 1977

[30] Foreign Application Priority Data

Sep. 1, 1976 [SE] Sweden ................................ 7609670

Feb. 9, 1977 [CO] Colombia ............................... 163829

[51] Int. Cl.$^2$ ............................................. G01N 21/26

[52] U.S. Cl. .................................... 250/574; 340/680; 356/438

[58] Field of Search ............... 250/573, 574, 575, 226, 250/214 A, 214 B, 208, 209; 356/207; 340/630

[56] References Cited

U.S. PATENT DOCUMENTS

| | | | |
|---|---|---|---|
| 3,796,887 | 3/1974 | Vincent et al. | 356/207 |
| 3,982,130 | 9/1976 | Trumble | 340/237 S |
| 4,001,595 | 1/1977 | Reisman | 250/575 |

*Primary Examiner*—David C. Nelms

*Attorney, Agent, or Firm*—Hane, Roberts, Spiecens & Cohen

[57] ABSTRACT

The invention relates to an optical fire-detector in which a radiation-emitting means is arranged to emit a beam of radiation and which has modulator means for the modulation of the beam of radiation in a phase-inverted relationship within a first and a second wavelength band, and a radiation-detecting means is arranged to receive the beam of radiation after it has passed through an intermediate air medium and includes first means for an individual measurement of intensity in the two wavelength bands and second means for the detection of such variations in the measured intensities which are representative for a fire.

6 Claims, 2 Drawing Figures

OPTICAL FIRE-DETECTOR

BACKGROUND OF THE INVENTION

The invention relates to an optical fire-detector in which a radiation-emitting means is arranged to emit a beam of radiation and which has modulator means for the modulation of the beam of radiation in a phase-inverted relationship within a first and a second wavelength band and a radiation-detecting means is arranged to receive the beam of radiation after it this has passed through an intermediate air medium and includes first means for an individual measurement of the intensity in the two wavelength bands and second means for the detection of such variations in the measured intensities which are representative for a fire.

An optical fire-detector of the above defined type is described in the Swedish Patent application No. 7604502-0 where the mutually phase inverted modulation within the first and the second wavelength band is for the purpose of enabling the individual measurement of the intensity in the two wavelength bands to be carried out by means of a single radiation-sensitive element. The fire detector can obtain a good discrimination against flicker generated by the surrounding electrical illumination by a method which is described in the Swedish Pat. No. 7310965-4. According to such method the beam of radiation is emitted in the form of a series of narrow high-power pulses, the radiation-detecting means being arranged to be frequency-selective for the rise time of the pulses.

One drawback with this known method is, however, that the fire detector achieves the desired discrimination against flicker generated by the surrounding electrical illumination only if the radiation detector as well as the radiation-emitting means have a short rise time of the order of $\mu s$. Thus, this method does not enable an efficient use of such radiation-sensitive elements in which a high sensitivity is achieved at the cost of a long rise time of the order of 100 $\mu s$.

The optical fire detector according to the invention achieves a good discrimination against flicker generated by surrounding electrical illumination without requiring a short rise time neither at the radiation detector nor at the radiation emitting means and enables an improved discrimination against such flicker which is generated when mechanical vibrations for example caused by heavy street traffic vary the outgoing direction of the beam of radiation from the radiation-emitting means.

DESCRIPTION OF THE DRAWING

The invention the characteristics of which appear from the appended claims will now be described more in detail with reference to the accompanying drawing where;

DESCRIPTION OF THE PREFERRED EMBODIMENTS

Figure 1:
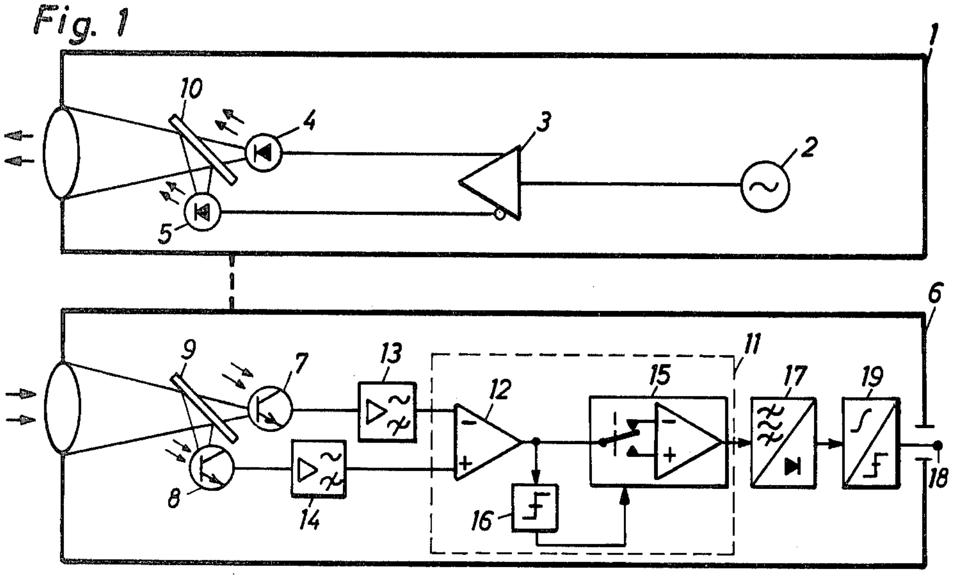
FIG. 1 shows a preferred embodiment of an optical heat-detector.

FIG. 1 shows a preferred embodiment of an optical heat-detector according to the invention. A radiation-emitting means 1 which is arranged to generate an outgoing beam of radiation comprises a sine-wave oscillator 2 arranged, to achieve via a phase inverter 3, a mutually phase-inverted modulation of the radiation intensity within a green wavelength band of a radiation contribution from a light emitting diode 4 and an infra-red wavelength band of a radiation contribution from a light emitting diode 5, respectively. A radiation detector 6 is placed at a distance from the radiation-emitting means 1 for receiving the beam of radiation after it has passed an intermediate air medium. The detector 6 comprises two photo-transistors 7 and 8 which are arranged to achieve a separate measurement of the intensity in the green and the infra-red wavelength band respectively in the beam of radiation. For this purpose a dichroic filter 9 is placed in front of the photo-transistor 7 in the path of the received beam of radiation and is arranged at an angle of 45 degrees relative this path. The second photo-transistor 8 is placed in the path of a part of the received beam of radiation reflected by the dichroic filter 9. The filter 9, which is known per se, transmits, according to the example, the green part of the beam of radiation to the photo-transistor 7 and reflects the infra-red part of the beam of radiation to the photo-transistor 8.

In the radiation-emitting means 1, a second dichroic filter 10 is placed in the path for the outgoing green radiation from the light emitting diode 4 and is arranged in an angle of 45 degree relatively this path, and the second light emitting diode 5 is placed so that its outgoing infra-red radiation is reflected by the filter 10 out into the same path as the outgoing green radiation from the light emitting diode 4. The green radiation from the light emitting diode 4 and the infra-red radiation from the light emitting diode 5 are transmitted and reflected respectively by the filter 10 substantially without any loss. There is thus a practically lossless summation of the radiation from the light emitting diodes 4 and 5.

According to the invention the radiation detector 6 comprises a demodulator 11 in which a summation means 12 according to the example has an inverting and a not-inverting input connected to the photo-transistor 7 and to the photo-transistor 8 respectively via the AC amplifiers 13 and 14 respectively. The summation means 12 produces a summation signal derived from the mutually phase-inverted modulation within the green and infra-red wavelength band in the beam of radiation from the radiation emitting means 1. The summation signal is supplied to a multiplier 15 which is arranged to shift the gain of the demodulator 11 between a positive and a negative value in synchronism with the mutually phase-inverted modulation within the green and infra-red wavelength band in the beam of radiation from the radiation emitting means 1. The utilized method for modulation and demodulation gives the demodulated summation signal the property of a good discrimination against flicker generated by surrounding electrical illumination.

According to the example the multiplier 15 has a control input connected to an output of the summation means 12 via a pulse shaping means 16. A suitable embodiment for the multiplier 15 is described in the publication Electronics, Jan. 9, 1975, p. 113. The pulse shaping means 16 consists according to the example of a voltage comparator with a grounded reference input.

The demodulator is connected to an AM-detector 17 for detection of such an amplitude modulation in the received beam of radiation which is representative for heat. For this purpose the AM-detector 17 comprises a band-pass filter which according to the example is arranged to pass the frequency interval 10–100 Hz. The AM-detector 17 is connected to a heat alarm output 18 via an integrating and threshold detecting means 19.

Figure 2:
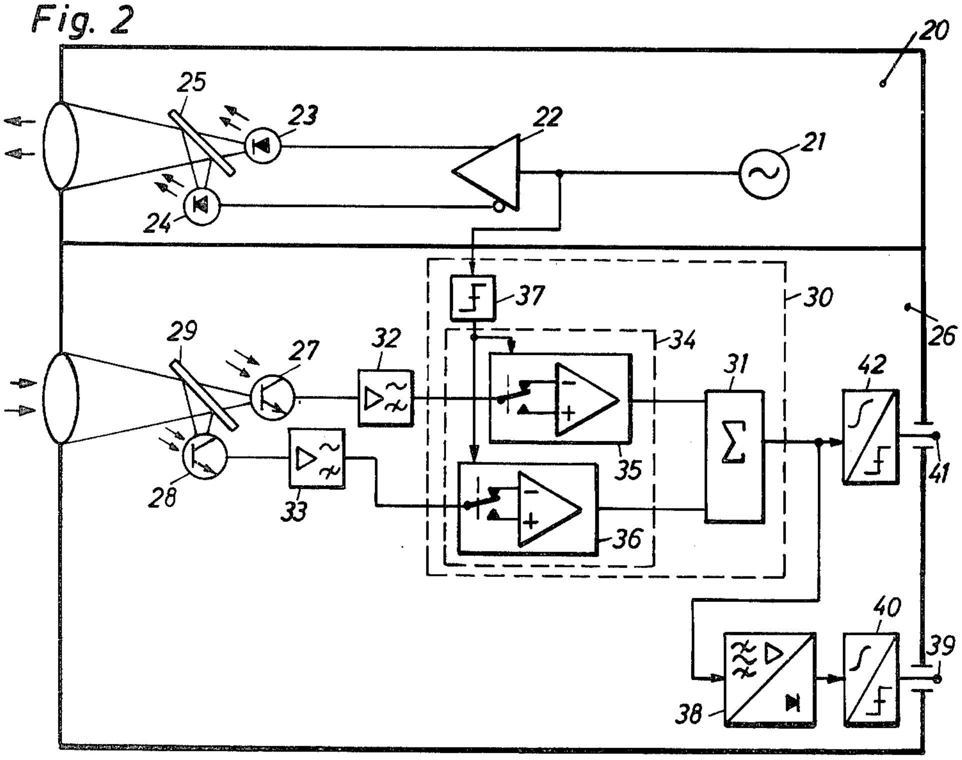
FIG. 2 shows a preferred embodiment of an optical heat- and smoke-detector.

FIG. 2 shows a preferred embodiment for an optical heat and smoke detector according to the invention. A radiation-emitting means 20 is arranged to generate an outgoing beam of radiation. The means 20 comprises the same means as the radiation-emitting means 1 in FIG. 1, namely a sine-wave oscillator 21, a phase inverter 22 controlled by the sine-wave oscillator 21 and arranged to provide a phase-inverted modulation of the radiation intensity of a green emitting light emitting diode 23 and an infra-red emitting light emitting diode 24 and a dichroic filter 25 for the superimposing of the radiation from the light emitting diodes 23 and 24 into an outgoing beam of radiation which completely corresponds to the outgoing beam of radiation in FIG. 1.

A radiation detector 26 is placed side by side with the radiation-emitting means 20 and is arranged to receive an incoming beam of radiation generated by reflection of the outgoing beam of radiation by means of a remote reflector (not shown). The radiation detector 26 comprises, like the radiation detector 6 in FIG. 1, two photo-transistors 27 and 28, a dichroic filter 29 and a demodulator 30. In the demodulator 30 a summation means 31 is included which according to the example has two identical inputs connected to the photo-transistor 27 and to the photo-transistor 28 respectively via the AC amplifiers 32 and 33 respectively and a multiplier means 34. The means 34 includes two multipliers 35 and 36 controlled in phase with each other and arranged to shift the gain between the photo-transistors 27 and 28 and their respective connected inputs of the summation means 31 between a positive and a negative value in synchronism with the mutually phase-inverted modulation within the green and infra-red wavelength band in the beam of radiation from the radiation-emitting means 20.

According to the example the multipliers 35 and 36 have a respective control input connected to the sine-wave oscillator 21 in the radiation-emitting means 20 via a common pulse shaping means 37 which is included in the demodulator 30 and consists of a voltage comparator with a grounded reference input.

The radiation detector 26 comprises an AM-detector 38 for detection of such amplitude variations in the received beam of radiation which is representative for heat. The AM-detector 38, which according to the example is connected to the photo-transistors 27 and 28 via said multipliers 35 and 36 of the multiplier means 34 and via said identical inputs of the summation means 31, is fed with a difference signal derived from the mutually phase-inverted modulation within the green and infra-red wavelength band in the beam of radiation from the radiation-emitting means 20. The AM-detector 38 comprises besides a band pass filter for the frequency range 10–100 Hz and an amplification means for raising the signal level before detection. The AM-detector 38 is connected to a heat alarm output 39 via an integrating and threshold detecting means 40.

In the radiation detector 26 the summation means 31 is further connected to a smoke alarm output 41 via an integrating and threshold detecting means 42 which thus is fed with the same difference signal as the AM-detector 38. The polarity of the difference signal for the smoke alarm is normally predetermined but if this is not the case then threshold detection can be carried out by means of a window comparator for which a suitable embodiment is described in Electronics, Sept. 5, p. 113–114.

In the heat and smoke detector in FIG. 2 the function for the heat alarm as well as for the smoke alarm is based on the experience that fire influences a beam of radiation to a different degree within two different wavelength bands and therefore can be detected by a difference measurement. This principal function enables providing a heat and smoke alarm with a very good discrimination against flicker generated by surrounding electrical illumination and gives furthermore a good discrimination against such flicker which is generated when mechanical vibrations caused by, for example heavy street traffic, vary the outgoing direction of the beam of radiation from the radiation emitting means 20.

The invention is not limited to the described embodiment but can be modified in many ways within the scope of the appended claims. For example, the photo-transistors 7 and 8 in FIG. 1 and 27 and 28 in FIG. 2 can be of photo-darlington type with two or even three transistor elements thanks to the fact that the utilized principle for modulation and demodulation enables a good discrimination against flicker possibly generated by surrounding electrical illumination also at a lower modulation frequency for example of the order of 1 kHz. This means that the entire rise time is allowed to amount to the order of 100 μs. The integrating and threshold detecting means 19 in FIG. 1 and 40 in FIG. 2 can be provided with such means for a more effective heat detection which are described in the German Pat. No. 2 051 640. At a low intensity of the beam of radiation received by the radiation detector 6 in FIG. 1 the pulse shaping means 16 can suitably be connected to the output of the summation means 12 via a phase-locked oscillator of a known construction for providing a phase shift of zero degrees between the outgoing and the incoming signal.

We claim:

1. In an optical fire-detector having a radiation-emitting means which is arranged to emit a beam of radiation and which includes modulator means for modulating the beam of radiation in a mutually phase-inverted relationship within a first and a second wavelength band and a radiation-detecting means which is arranged to receive the beam of radiation after it has passed through an intermediate air medium and which includes first means for an individual measurement of the radiation intensity in the two wavelength bands and second means for detection of such variations in the measured intensities which are representative for fire, the improvement comprising a demodulator connected between said first and second means, said first means comprising first and second radiation-sensitive means for selectively sensing radiation in said first and second wavelength bands respectively, a summation means connected to said first and second radiation-sensitive means and a multiplexer means for shifting the gain in a signal path in the demodulator between a positive and a negative polarity in synchronism with the mutually phase-inverted modulation within the two wavelength bands in the beam of radiation.

2. Optical fire-detector according to claim 1, characterized in that said summation means is connected to said first and second radiation-sensitive means via an inverting and a not-inverting input respectively, and said multiplexer means is connected in cascade with the summation means.

3. Optical fire-detector according to claim 1, characterized in that said summation means is connected to said first and second radiation sensitive means via two identical channels and two multiplexer elements included in said mutplier means said elements being controlled to operate in phase with each other.

4. Optical fire-detector according to claim 1, characterized in that the switching of said multiplexer means is controlled by one of said radiation-measuring means.

5. Optical fire-detector according to claim 1, characterized in that the switching of said multiplexer means is accomplished by a control input connected to said first radiation-measuring means via a phase-locked oscillator circuit.

6. Optical fire-detector according to claim 1, characterized in that the switching of said multiplexer means is controlled by the radiation-emitting means.

* * * * *

UNITED STATES PATENT AND TRADEMARK OFFICE
CERTIFICATE OF CORRECTION

PATENT NO. : 4,156,816

DATED : May 29, 1979

INVENTOR(S) : Erik G. Lindgren

It is certified that error appears in the above-identified patent and that said Letters Patent are hereby corrected as shown below:

In Claims 1 through 6, the word "multiplexer" should be "multiplier" in every instance.

Signed and Sealed this

***Eighteenth* Day of *September 1979***

[SEAL]

*Attest:*

LUTRELLE F. PARKER

*Attesting Officer* *Acting Commissioner of Patents and Trademarks*